May 25, 1954
R. H. BREEBACK
2,679,346
FILING SYSTEM
Filed July 13, 1950
7 Sheets-Sheet 1
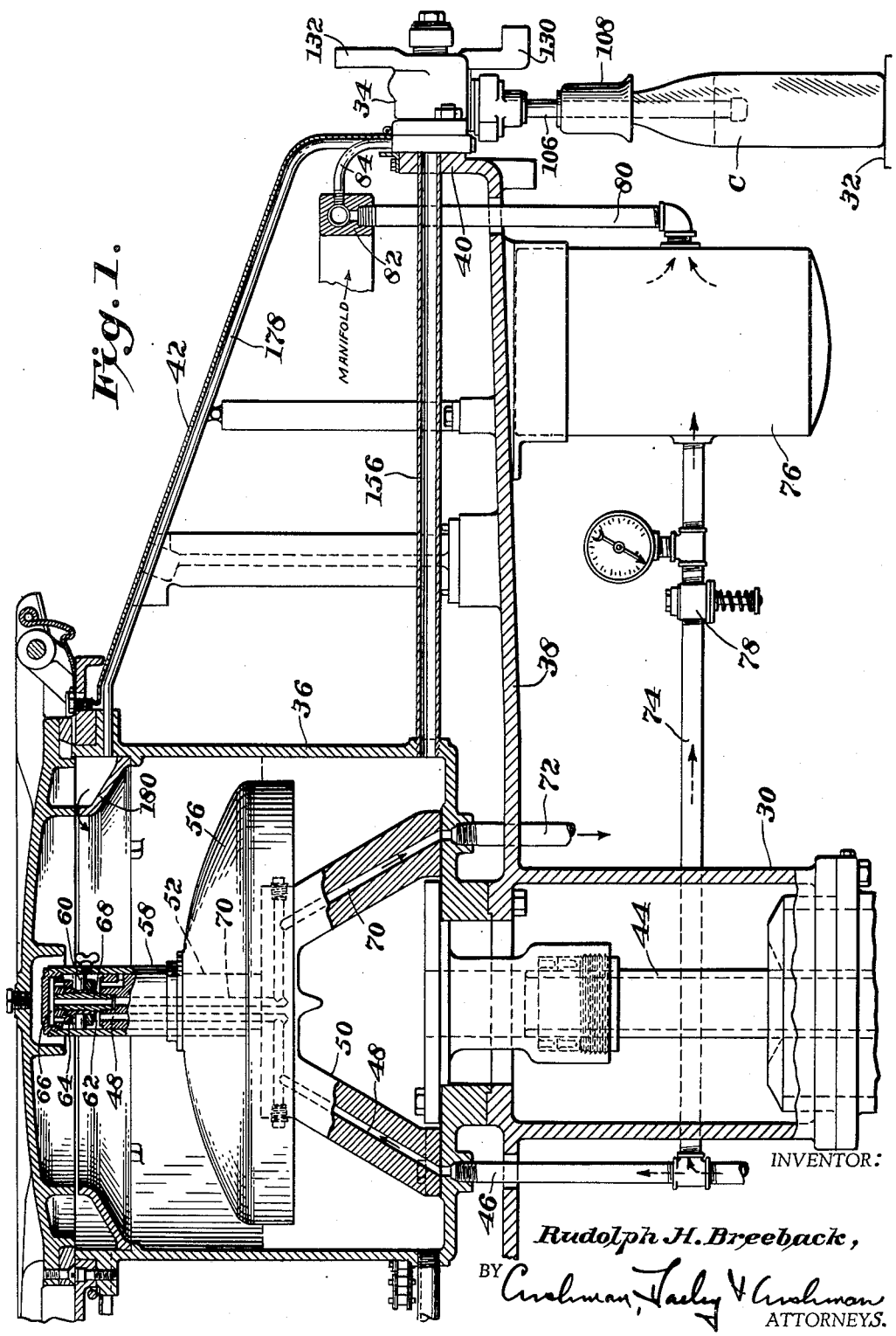
INVENTOR:
Rudolph H. Breeback,
BY Cushman, Darby & Cushman
ATTORNEYS.

May 25, 1954  R. H. BREEBACK  2,679,346
FILLING SYSTEM
Filed July 13, 1950  7 Sheets-Sheet 2
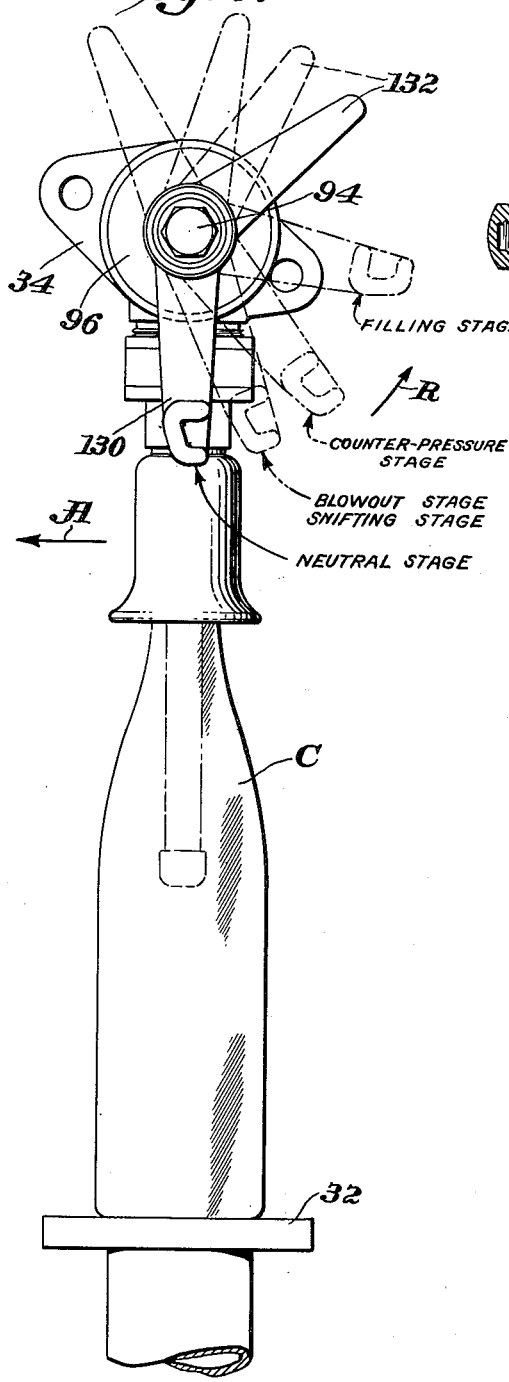
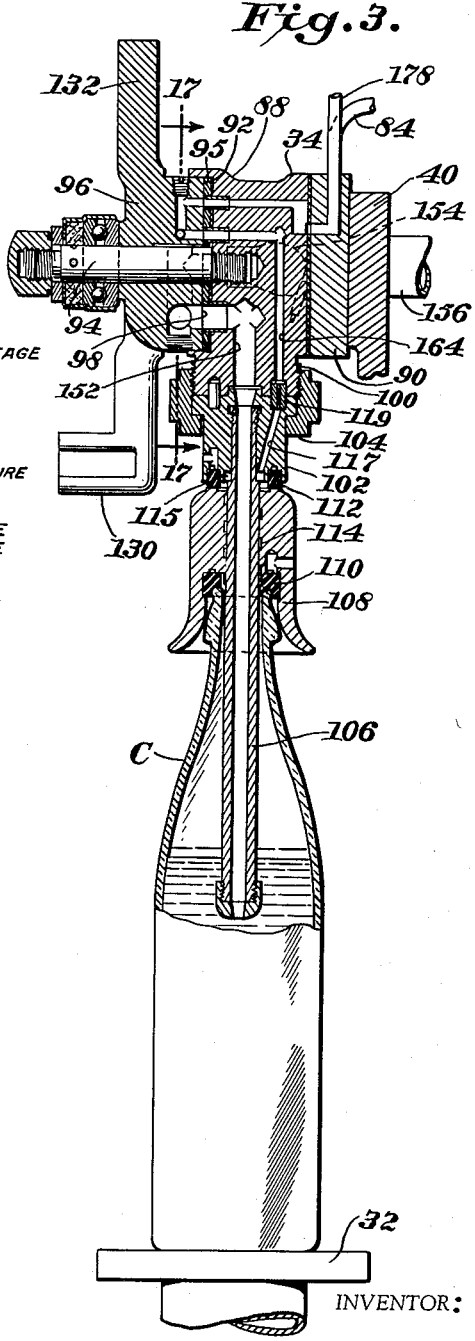
INVENTOR:
Rudolph H. Breeback,
BY Cushman, Darby, & Cushman
ATTORNEYS.

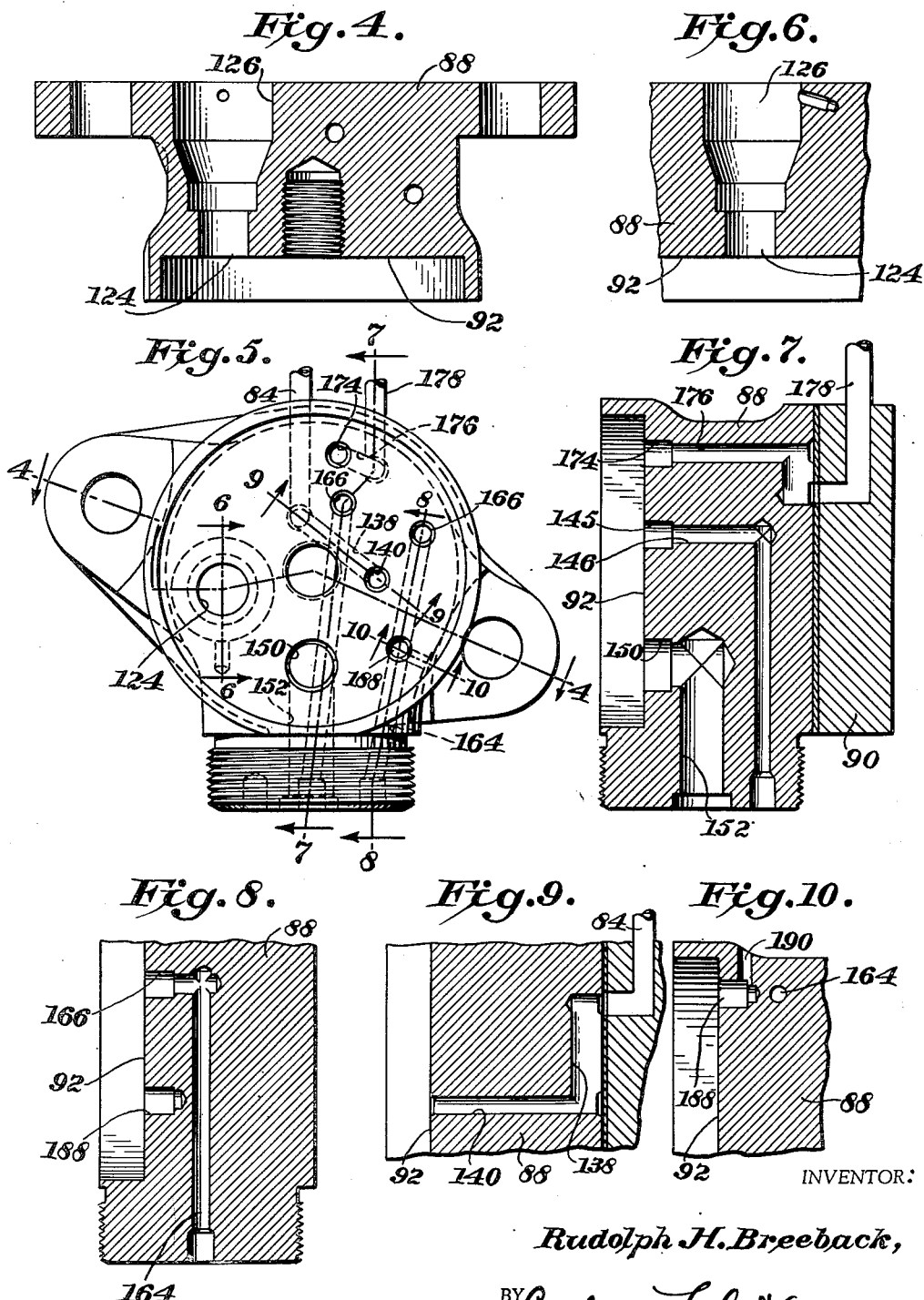

May 25, 1954     R. H. BREEBACK     2,679,346
FILLING SYSTEM
Filed July 13, 1950     7 Sheets-Sheet 4
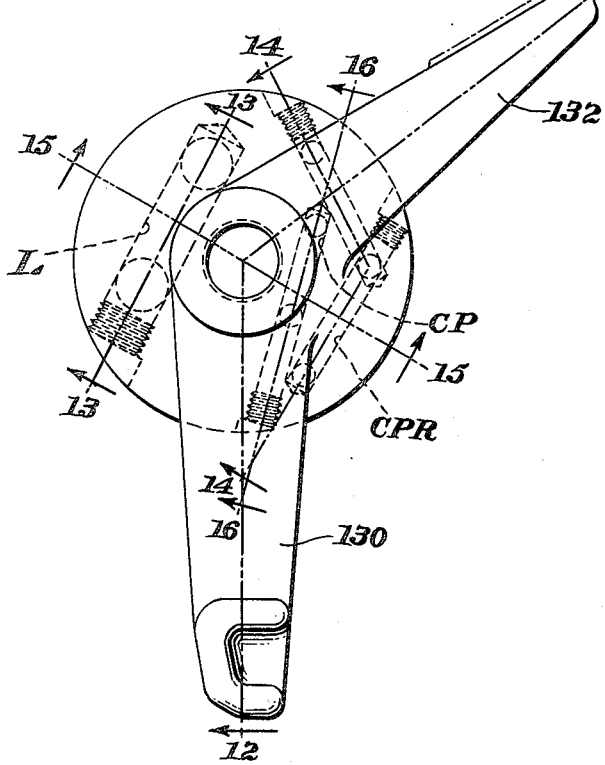
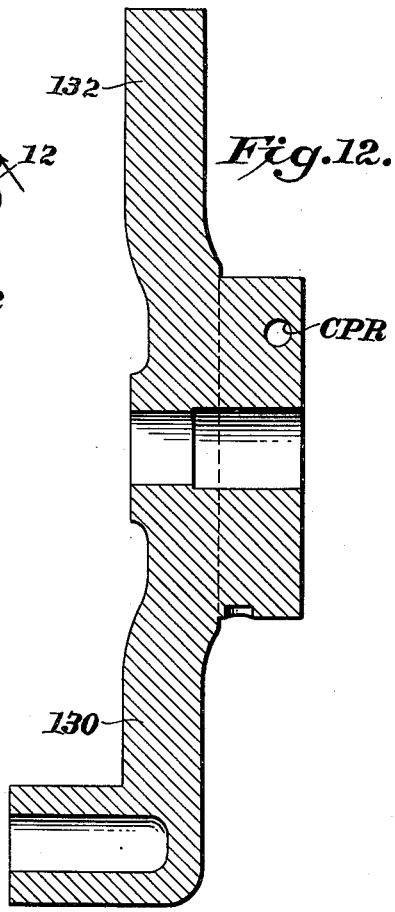
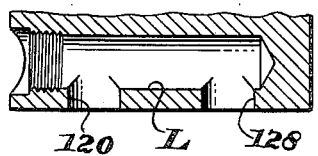
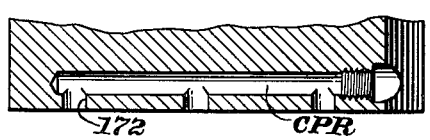
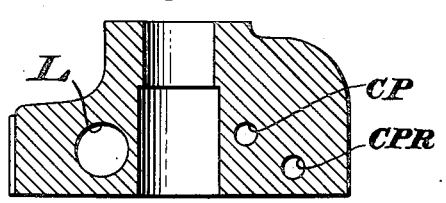
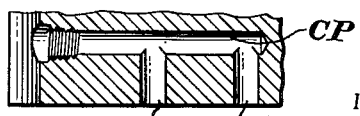
INVENTOR:
Rudolph H. Breeback,
BY
ATTORNEYS.

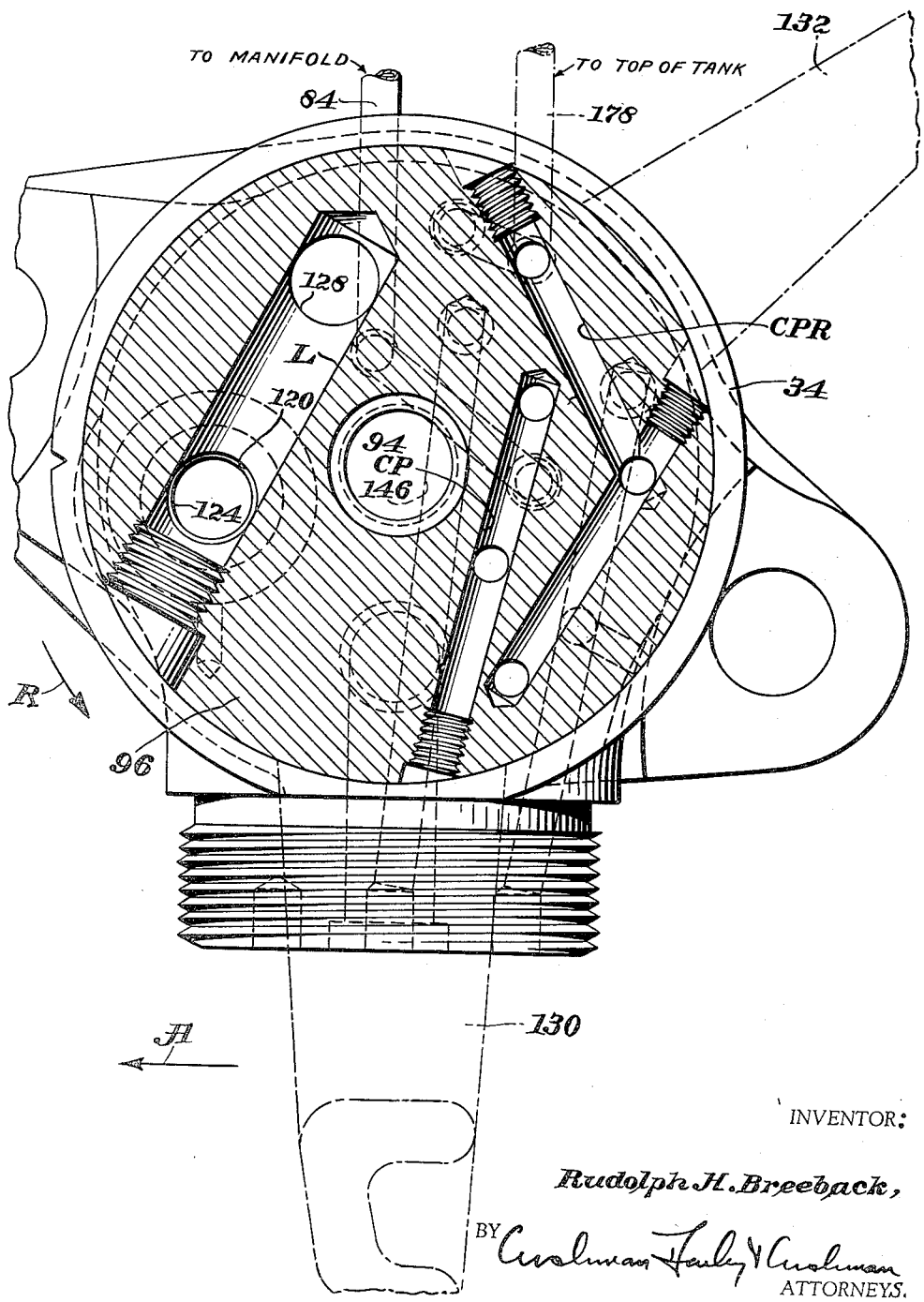

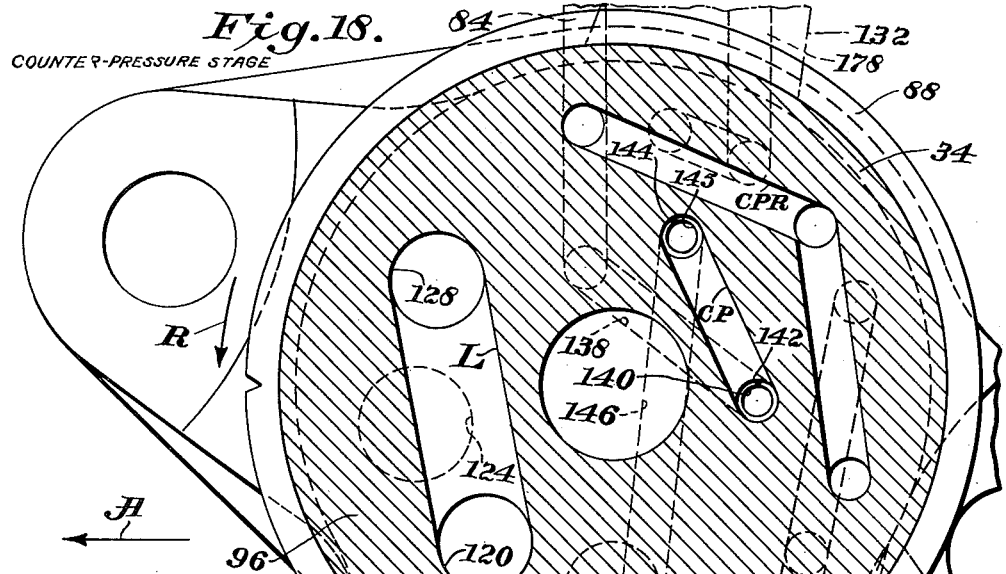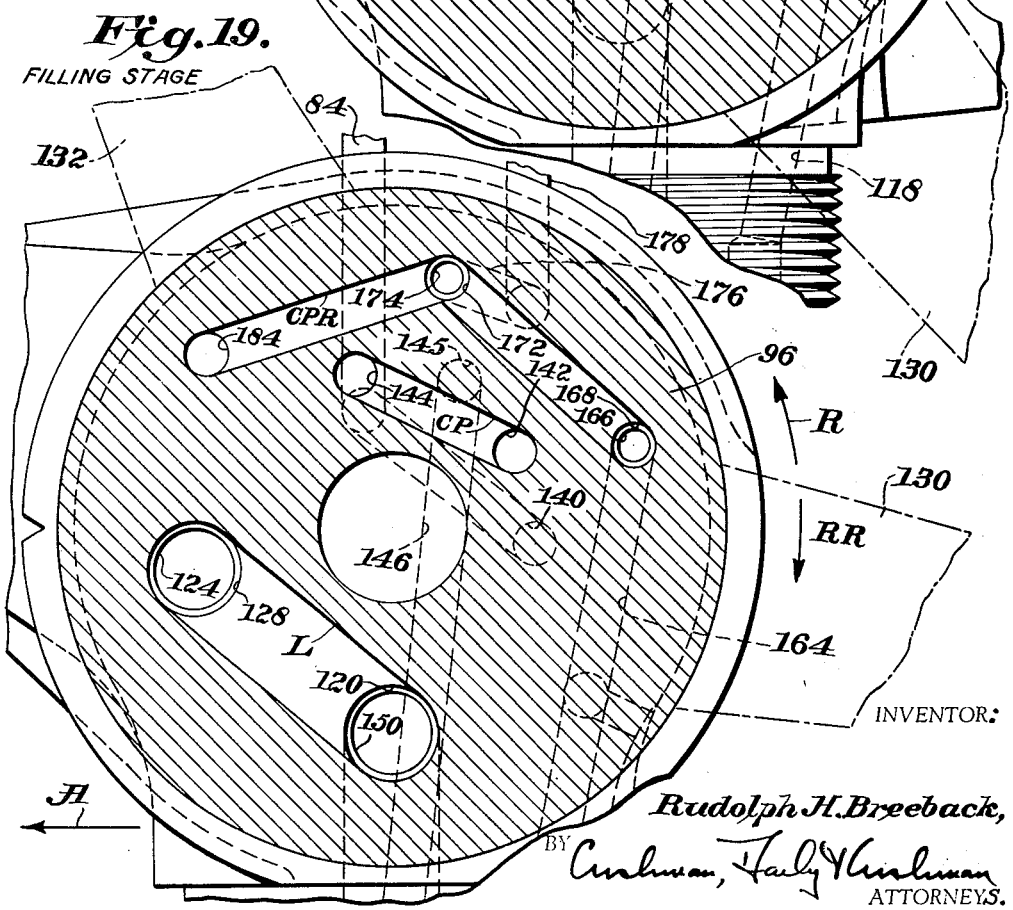

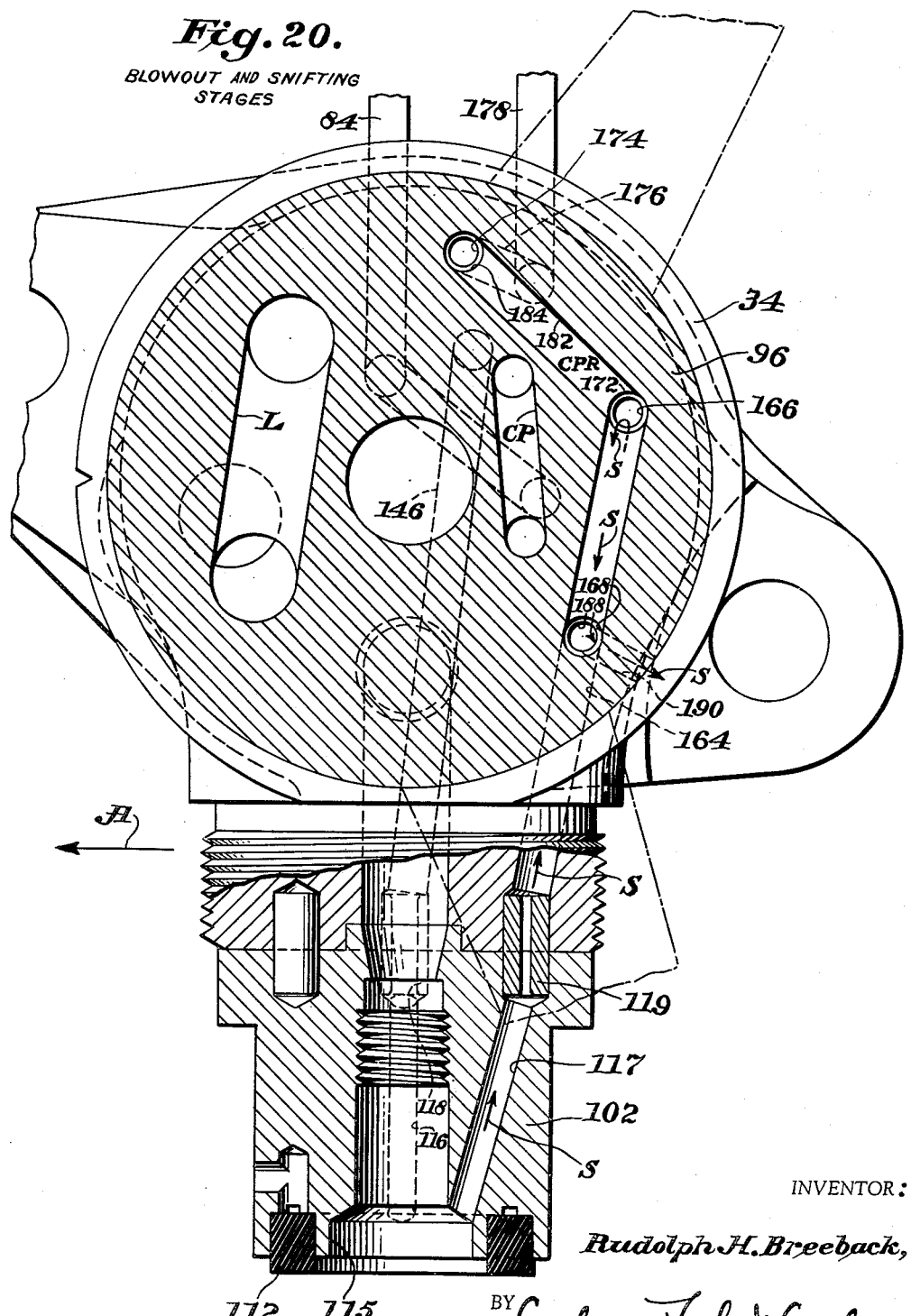

Patented May 25, 1954

2,679,346

UNITED STATES PATENT OFFICE 2,679,346

FILLING SYSTEM

Rudolph H. Breeback, Baltimore, Md., assignor to Crown Cork & Seal Company, Inc., Baltimore, Md., a corporation of New York Application July 13, 1950, Serial No. 173,503

9 Claims. (Cl. 226—98)

The present invention relates to filling systems and, more particularly, to filling systems used in the bottling of carbonated beverages.

In the bottling of beer and other carbonated beverages, the liquid is usually flowed into the bottle from a reservoir containing a body of the liquid and a superposed body of gas under a certain pressure, for example, five to six pounds per square inch. The filling cycle includes the initial step or stage of placing the bottle or other container in sealed relation with a filling head including a filling valve. Then the filling valve is operated to place the container in communication with the gas containing portion of the reservoir so that a pressure generally corresponding to the pressure of the gas in the upper portion of the reservoir will be established in the container. Then the filling valve is operated so that liquid will flow from the reservoir to the container while the gas in the container will be returned to the gas space of the reservoir. This flow of liquid occurs at a moderate rate because it is solely due to the gravity effect resulting from the fact that the reservoir is positioned slightly above the container. Therefore, the liquid flow is sufficiently quiet to minimize foaming. The flow of liquid into the bottle is stopped after a predetermined flow or period of time. Then the upper portion or headspace of the bottle may be placed in restricted communication with the atmosphere, i. e., snifted, to relieve some of the headspace pressure before the bottle is lowered from the filling head. In some installations, after the container has been lowered from the filling head, gas is flowed from the upper portion of the reservoir through the gas return passages of the filling head to clear those passages.

A beverage filling machine provided with a rotary filling table including fifty filling heads and a corresponding number of container supporting platforms is provided with an infeed dial to position the containers upon the supporting platforms and also an outfeed dial to remove the filled containers from the platforms. With the closest practicable spacing of the infeed and outfeed dials, a container only may travel between 320° and 325° with the filling table. During this travel, the filling head valve will first be operated to establish counterpressure in the bottle. Under normal practice, this portion of the path of travel extends about 30°. If the bottle is snifted to atmosphere before it is lowered from the filling head, approximately 30° of the travel will be consumed for this snifting. Therefore, with approximately 325° of the path of travel available for the full filling cycle, approximately 60° is consumed with the counterpressure and snifting stages, leaving only 265° for the flow of liquid into the container. Obviously, the time or travel space available for liquid flow primarily determines the output of filled containers.

Stated another way, under the practice now followed, assuming that the filling machine includes fifty filling heads and filling platforms, not more than forty-four of the platforms can support containers at any given moment and liquid will be flowing into only thirty-six of these.

Because of the fact that a carbonated liquid cannot be flowed too rapidly into a container, it is not possible to increase the speed of rotation of the filling table by too great an extent to thereby increase the output of filled bottles. Therefore, the usual procedure to obtain a high output of filled containers per minute has been to increase the number of filling heads and platforms upon the machine. Any increase in the size of the filling table increases the cost of the machine. Also, any increase in the number of filling heads and platforms requires an increase of the diameter of the rotary filling table and there is a limitation upon this factor. In more detail, a filling machine for twelve ounce bottles and which includes fifty filling heads requires a filling table having a diameter of approximately six feet. Obviously, the diameter of the filling table and reservoir cannot be substantially increased beyond six feet without introducing the possibility of considerable vibration and wear upon the bearings of the machine.

An object of the present invention is to enable the output of filled containers to be increased without increasing the speed of rotation of the filling table or the diameter of the filling table.

Another object of the invention is to provide a filling system of such character that the time required for the counterpressure stage will be reduced to a minimum.

I have discovered that the time required for counterpressure can be reduced by supplying the containers with counterpressure from a source separate from the filling reservoir and which is at relatively high pressure as compared to the pressure of the superposed body of gas in the filling reservoir. For example, by the present invention, the usual 30° of rotary travel required for the counterpressure stage can be reduced to approximately 7½°. Thus, 22½° normally used for the counterpressure stage is freed for the liquid flow stage. On a machine provided with fifty filling heads, this increases the output of the machine by three bottles on each rotation of filling table; an output increase of approximately 7½%.

Another object of the invention is the provision of a filling head wherein the gas flowing into the container for counterpressure will move through passages or flow lines which are independent of the passages or flow lines used for venting the bottle to the filling reservoir.

In the usual filling head, the passages through which gas flows from the reservoir to the container to establish counterpressure in the container are also used for return of gas from the container to the filling reservoir. During the latter portion of the period that liquid is flowing into a bottle and gas is being returned to the reservoir, some liquid or foam may move up into the gas return passage of the filling head. If this liquid or foam remains in the passage, it will initially block the flow of counterpressure gas from the reservoir into the next container placed under the filling head, with the result that establishment of counterpressure in that container is slightly retarded. The cycle of the machine must be adjusted to compensate for the above-mentioned retardation of counterpressure. The provision of separate passages for the counterpressure flow and the venting flow included in the present invention eliminates the necessity of compensating for any blocking of counterpressure flow and thereby adds to the output of filled containers.

A further object of the invention is to provide a filling system whereby containers can be counterpressured with carbon dioxide or other inert gas.

A further advantage of counterpressuring containers from a source separate from the filling reservoir is that such source can supply carbon dioxide gas, instead of the mixture of air and carbon dioxide gas usually present in the upper portion of the filling reservoir. Any arrangement which reduces the possibility of air contacting with a carbonated beverage, and particularly with beer, results in an improved beverage.

Other objects and advantages of the invention will be apparent from the following specification and accompanying drawings.

In the drawings, Figure 1 is a radial section through the upper portion of a beverage filling machine.

Figure 2 is a front elevation of a filling head.

Figure 3 is an axial section of the filling head of Figure 2 showing the flow ports in liquid flow stage position.

Figure 4 is a transverse section of the filling head body element, the view being taken on the angled line 4—4 of Figure 5.

Figure 5 is an elevation of the seat face of the filling head body element.

Figure 6 is a detailed transverse section on the line 6—6 of Figure 5.

Figure 7 is a transverse section on the angled line 7—7 of Figure 5.

Figures 8, 9 and 10 are detailed transverse sections on the correspondingly numbered lines of Figure 5.

Figure 11 is a front elevation of the filling head disk valve.

Figures 12, 13, 14, 15 and 16 are sectional views on the correspondingly numbered lines of Figure 11.

Figure 17 is a fragmental view of the filling head body element and disk valve, the view showing the disk valve in transverse section substantially on the line 17—17 of Figure 3. The view shows the disk valve in neutral or closed position.

Figure 18 is a fragmental view similar to Figure 17 but omitting some of the details of the latter figure. Figure 18 shows the disk valve in counterpressure stage position.

Figure 19 is a fragmental view similar to Figure 18 but showing the disk valve in filling stage position, and Figure 20 is a fragmental view similar to Figure 18 but showing the disk valve in the position it occupies during snifting of a container to atmosphere and when passages of the head are to be blown out.

Figure 1 illustrates a beverage filling machine of the general type disclosed in the United States patents of Robert J. Stewart and Wiltie I. Gladfelter Nos. 2,097,107 and 2,202,033 for Filling Machine issued October 26, 1937, and May 28, 1940, respectively. In more detail, the machine includes a stationary base and bearing post, not shown, and on which a hollow column or sleeve generally designated 30 is rotatably mounted. The sleeve 30 carries a filling table, not shown, such as disclosed in said patents and which filling table is fitted with a number of bottle supporting platforms 32. The sleeve and table are rotated about the bearing post by a motor and suitable means, including cams, is provided to cause the container supporting platforms 32 to be lowered to receive a container C from an infeed dial as disclosed in said patents, and then raised to bring the container into engagement with depending filling head 34 so that the filling cycle will be performed with respect to the container. Thereafter, the container supporting platform will be lowered to enable the container to be removed from the platform by the usual outfeed dial.

The sleeve 30 also carries the filling reservoir generally designated 36. A horizontally extending apron or flange 38 projects outwardly from reservoir 36, this skirt being upturned at its outer edge to provide a shoulder 40. The filling heads 34 are secured to the shoulder 40 in the usual manner and in vertical alignment with the respective filling platforms 32. A skirt 42 extends from shoulder 40 to the upper portion of reservoir 36 to enclose piping extending between the filling heads and reservoir.

Assuming that the filling machine is to be used to fill bottles or other containers with beer, the beer will be delivered to the lower portion of reservoir 36 from a Government vat, the beer entering the lower portion of reservoir 36 by a pipe 44 which extends axially of the filling table and reservoir. A collar depending from the reservoir has a sealed engagement with the upper end of the pipe 44. In order to maintain the beer in the reservoir at the desired level and under suitable pressure, gas or air is delivered to reservoir 36 from a suitable pressure source, this gas being delivered to the upper portion of the machine by a pipe line 46 shown in Figure 1. It will be understood that pipe line 46, which rotates with the sleeve 30, is suitably connected to a stationary pipe line, not shown, leading to the machine base from the source of gas under pressure.

Pipe line 46 extends through the lower wall of filling reservoir 36 and opens to a passage 48 extending through one leg of a tripod 50 fixed in the reservoir. The tripod 50 as a post 52 extending upwardly from its central portion and the passage 48 opens to the top surface of post 52. A float 56 is vertically slidable on post 52 in accordance with the level of the beer in the reservoir, the float including a sleeve 58 which encircles the post. Within its upper portion, sleeve 58 carries a movable valve element 60 including a downwardly facing gasket 62 and an upwardly facing gasket 64. The downwardly facing gasket 62 is adapted to engage the upper end of the passage 48 to cut off infeed of gas to reservoir 36 through the passage 48 when the level of the beer in the filling reservoir drops. When the beer level rises, the upwardly facing gasket 64 will engage a series of ports which open downwardly from a chamber 66 provided upon the upper end of a hollow tube 68 which projects upwardly from post 52. The chamber 66 is in communication with the bore of tube 68, which bore opens to a passage 70 extending through another leg of the tripod 50. An exhaust line 72 to atmosphere communicates with the passage 70.

It will be understood that the float 56 and valve element 60 operate in accordance with the system disclosed in said first-mentioned Stewart and Gladfelter United States patent to maintain the level of the beer in the filling reservoir within a suitable level and at a pressure such as hereinafter discussed.

A horizontal pipe line 74 is connected to the gas supply pipe line 46, line 74 extending to a gas reservoir 76 preferably secured to the undersurface of the apron 38. A pressure regulating valve 78 and gauge may be located in the line 74 in advance of gas reservoir 76, the pressure regulator serving to deliver gas to reservoir 76 at a desired pressure. A line 80 extends outwardly from gas reservoir 76 to a circular manifold 82 which encircles filling reservoir 36 immediately adjacent and above the upstanding shoulder 40, so as to be adjacent the filling heads 34. As is hereinafter explained, a plurality of tubes 84 extend from the manifold, so that each filling head 34 is connected to manifold 82 by a separate tube 84.

As an example, gas line 46 may be connected to a source of carbon dioxide gas or other suitable gas and which source is at a pressure of thirty pounds per square inch. If the gas in the upper portion of reservoir 36 is to be at a pressure of five to six pounds, regulator 78 will be set to maintain a pressure of about eighteen pounds in gas reservoir 76 and manifold 82. Even though passage 48 is open to line 46 and the eighteen pound pressure source, valve 60 operated by the filling reservoir float 56 will maintain a pressure of gas in filling reservoir 36 commensurate with the pressure at the source of liquid. For example, if line 44 is connected to a beer vat which is at such pressure that it delivers beer to reservoir 36 at a pressure of from five to six pounds, float valve 60 will throttle the gas flow from passage 48 to maintain the five to six pound pressure mentioned above in the upper portion of reservoir 36.

It will thus be seen that the gas in the upper portion of the reservoir (usually relied upon to counter-pressure containers) may be at a normal pressure, but that the gas in the manifold 82, which I rely upon to counter-pressure the containers, can be at a substantially higher pressure.

The provision of the gas reservoir 76 between the pressure regulator 78 and the manifold 82 insures that no pressure drop will occur because of wire drawing effect at the pressure regulator.

A filling head 34 of the present invention is generally illustrated in Figures 2 and 3. Each filling head includes a body element 88 closed at its inner side by a plate 90 fixed to shoulder 40 as also shown at the right of Figure 1. Each body element 88 includes a planar face 92 of circular outline and to which various passages open as hereinafter described. A stud 94 projects from the central portion of the seat face 92 and a disk-like valve element 96 is rotatable upon stud 94, the valve element including a seat face 98 to which various passages within the disk valve open as hereinafter described, these passages bridging various passages of body element 88 to control flow of gas and liquid through filling head 34. For convenience of description, face 92 of body element 88 is hereinafter referred to as the seat face of the body element. It will be observed that a compressible and resilient disk 95 such as described in said last-issued patent actually is the face against which valve disk 96 bears.

In accordance with usual practice, a threaded boss 100 depends from body element 88 and an adapter collar 102 is secured to boss 100 by means of a threaded collar 104. The liquid delivery tube 106 of the filling head is supported centrally of adapter 102 to project downwardly toward the corresponding filling platform 32. A container centering bell 108 is vertically slidable upon liquid tube 106, the bell including a sealing ring 110 against which the mouth of a container C is adapted to seal. When centering bell 108 is in the raised position of Figures 2 and 3, it will be in sealed position with respect to an annular gasket 112 provided on the lower face of adapter collar 102. The bore of the centering bell is provided with a spiral passage 114 surrounding the liquid tube, the lower end of passage 114 opening within the sealing ring 110 so as to communicate with the bottle mouth. The upper end of spiral passage 112 opens to a recess or chamber 115 formed in the lower face of collar 102 and within gasket 112 so that chamber 115 thereby surrounds the liquid tube 106. As is best shown in Figure 20, two passages 116 and 117 extend diagonally to the upper surface of collar 102, these passages being inclined upwardly and outwardly and lying in different radial planes. Each passage has a sleeve fitted in its upper end, the bore of sleeve 118 of passage 116 being the same size as that passage, but the sleeve 119 of passage 117 has a bore more restricted than passage 117.

The arrangement of the passages in the body element 88 and the disk valve 96 as well as the manner in which the passages of the disk valve 96 are arranged to control flow through the filling head are hereinafter discussed in detail in connection with the various stages of operation of the filling head. However, it will be observed from Figure 17 that the disk valve includes three passages L, CP and CPR. Passage L is for liquid flow, passage CP for counterpressure flow, and passage CPR for counterpressure return flow as well as for snifting and blowout flow. As appears in Figures 13 and 16, the passages L and CP are of U-shaped form in planes parallel to the disk valve axis. As is shown in Figure 17, passage CPR is angled in a radial plane and includes a port to seat face at each end, as well as an intermediate port at the angle.

Figures 17 to 20 show the disk valve in the position it occupies during various stages of the cycle. In these figures, Figure 17 is a true section in a radial plane whereas Figures 18 to 20 omit certain details. In each of Figures 17 to 20, whenever a port of the disk valve element is in registration with a port of the body element, the body element port is diagrammatically indicated by a circle of reduced size so that the alignment of the two ports will be more apparent. The various passages of the body element 88 are best illustrated in detail in Figures 4 to 10 while the passages of disk valve 96 are illustrated in detail in Figures 11 to 16.

Neutral stage

Referring to Figure 17, during the neutral stage of the filling cycle of a filling head 34, the passages of disk valve 96 are so arranged with respect to the passages of body element 88 that no flow of gas or liquid occurs through filling head 34. In more detail, as is shown in Figure 17, while one port 120 of the liquid passage L of the disk valve is in registration with the port 124 of the body element liquid supply passage 126 (Figure 4), the other port 128 of the passage L is opposite a blank portion of the body element seat face or seating gasket 95 and, therefore, no flow of liquid through the filling head will occur. None of the ports of the gas flow passages CP or CPR is aligned with any gas passage of the body element during the neutral stage.

As is described in said Stewart and Gladfelter Patent No. 2,202,033, the disk valve 96 is provided with two radially extending arms 130 and 132. The position of these arms during neutral stage is illustrated by solid lines in Figure 2 from which it will be observed that arm 130 depends in a substantially vertical plane while arm 132 extends upwardly.

While the disk valve of a filling head is in the neutral stage position, a container C to be filled will be placed upon the corresponding filling platform 32 by an infeed dial, and the filling platform will then rise to lift the container to the position illustrated in Figures 2 and 3, the raising or lifting movement of the container C causing its mouth to engage the sealing ring 110 of centering bell 108 to slide the centering bell upwardly along the liquid tube 106 until the upper surface of the centering bell engages the gasket 112 at the lower end of the collar 102. When this occurs, the container C will be sealed to the filling head.

Counterpressure stage

With the filling table and reservoir of the machine rotating in a clockwise direction so as to carry the filling heads in the direction of the arrow A of Figures 7 and 17 to 20, the lower arm 130 of a valve disk 96 will contact with a counterpressure trip as described in said Patent No. 2,202,033 so that the disk valve 96 will rotate in the direction of the arrows R, viz., in a counterclockwise direction, about stud 94 to the dotted line position designated "Counterpressure Stage" in Figure 2. The position which the disk valve passages will occupy with respect to the body element passages during counterpressure stage position is shown in Figure 18. It will be noted that during this rotation, the passage CPR will quickly pass through the position indicated in Figure 20 and which is hereinafter discussed under the heading "Snifting Stage." However, at this moment there is no pressure in passage CPR or in the container so the registration is of no effect.

As is indicated in Figure 18, the rotation of the disk valve 96 to counterpressure stage position will move the port 120 of liquid passage L out of alignment with the liquid support port 124 of body element 88 but will be insufficient to bring the other port 128 of passage L into alignment with port 124. Counterpressure passage CP in disk valve 96 will be brought into registration with body element ports so that flow of gas from high pressure manifold 82 to the container C will occur as follows: From manifold 82 by tube 84 to a recess 138 (Figure 9) in the rear face of body element 88 and thence by a passage 140 extending through the body element to its seat face 92. Referring to Figure 18, the mouth of passage 140 is designated by a reduced size circle in alignment with port 142 of the valve disk passage CP so that gas from manifold 82 will move into this disk valve passage. The other port 144 of passage CP is in registration with the port 145 of an angled passage 146 (Figure 7) of body element 88, angled passage 146 extending downwardly as shown in Figures 18 and 20 to registration with the adapter collar passage 116 which opens to the recess 115 in the lower end of the adapter collar. With the centering bell and container sealed with respect to adapter collar 102, the gas from manifold 82 will move from recess 115 through the spiraled passage 114 and into the container.

The above described counterpressure gas flow path will exist for only a very brief interval of time. For example, if the filling machine is one provided with fifty filling heads and bottle supporting platforms, and the filling table is rotating at a speed to fill 250 twelve ounce bottles per minute, and if the pressure in the manifold 82 is at approximately 18 pounds per square inch, the counterpressure stage need only exist for about ¼ of a second to establish a counterpressure of approximately four pounds per square inch in the container C. If the pressure existing above the liquid in reservoir 36 is from five to six pounds, a counterpressure of four pounds in the container C will result (during the subsequent filling stage of the cycle) in a flow of liquid which is little, if any, faster than a gravity flow. The explanation for such rate of flow to a point which is at lower pressure than reservoir 36 is that the flow passages are of some length and include angles which frictionally retard the liquid flow. Liquid flow by gravity alone is least apt to create foaming, though if the reduced pressure in container C causes a slightly faster flow, foaming still will not occur or will be so slight that it will not be harmful.

In a filling machine having the characteristics and output discussed above, and where the counterpressure in the container is established directly from the gas above the liquid in the reservoir 36 and which is at a pressure of five to six pounds, the counterpressure stage must be maintained for approximately one second. This means that a filling head moves approximately eighteen inches with the filling table. By the procedure of the present invention, during the counterpressure stage the filling head moves only approximately four inches with the filling table. Filling heads are normally spaced on four inch centers about a filling reservoir and filling table.

As has been indicated above, the travel and time thus saved by the counterpressure system of the invention can be used for the liquid flow stage. Stated another way, the speed of rotation of the machine can be increased to move containers through a longer filling stage arc of travel at a higher linear speed than heretofore, so that a greater output of containers will be obtained in a given period of time.

Liquid flow stage

When a filling head has moved about four inches with a filling reservoir in a direction of arrow A of Figure 2, the lower arm 130 of the disk valve 96 will contact a second trip which will rotate valve 96 about the stud 94 in the direction of the arrow R, thereby moving the passages of valve 96 to the position relative to the body element passages indicated in Figure 19. As is illustrated in Figure 19, counterpressure gas passage CP of the disk valve now will be closed at both ends. That is, port 142 will be out of alignment with the gas supply passage 138 leading from manifold 82 and port 144 will be out of alignment with the port 145 of the counterpressure delivery passage 146 leading to container C.

The liquid passage L of the disk valve will now have its port 128 in registration with the port 124 of the liquid supply passage 126 and its other port 129 will be in registration with the port 150 of an angled liquid delivery passage 152 (Figure 7) in the body element 88. Passage 152 extends downwardly to the liquid tube 106. The liquid supply passage 126 (Figure 6) is enlarged at its rearward end to receive a ball check 154 in accordance with usual practice and is connected to a tube 156 which extends to the lower portion of the reservoir 36. Therefore, liquid in reservoir 36 will flow through tube 156 and thence through the body element passage 126 into the U-shaped liquid passage L of the disk valve and thence downwardly by the passage 159 and filling tube 106 into the container C. Because the counterpressure in the bottle at least substantially balances the pressure above the liquid in reservoir 36 the flow of liquid into the bottle will not be so rapid as to create foam.

While the liquid is flowing into container C as described above, the counterpressure gas and air in container C will be returned to the upper portion of reservoir 36 as follows: Through the spiral passage 114 to recess 115 and then through the passage 117 (Figures 3 and 20) in the adapter collar 102. The restricted bore of sleeve 119 in passage 117 will not restrict this return flow more than is usually the case. Sleeve 119 opens to an angled passage 164 in the body element 88. The form of passage 164 is also shown in Figure 8 from which it will be noted that it opens to the body element seat face 92 through a port 166. Gas issuing from passage 164 and port 166 will enter a port 168 at one end of disk valve passage CPR and leave the passage 170 through a port 172 intermediate passage CPR and which will be in registration with a port 174 of a valve element passage 176 which extends to the rear face of the body element (Figure 7) to communicate with a tube 178 leading from the filling head to the upper and gas containing portion of the filling reservoir 36. As is described in said Stewart and Gladfelter patents, this gas return passage 178 opens to a portion of the reservoir which communicates with the body of the reservoir by an annular baffle 180 to prevent foam from blocking the portion of the reservoir adjacent the passage mouth.

As is illustrated in Figure 19, one leg 182 of the angled passage CPR will be out of the flow path of the counterpressure return, the port 184 at the free end of this leg being opposite a blank portion of the gasket 95.

It will be noted that the only portion of the counterpressure return path which is also used for counterpressure path is the spiral passage 114 of the centering bell 108 and the recess 115 in the lower end of the adapter collar 102. In more detail, counterpressure enters the recess through the passage 116, whereas counterpressure return moves from the recess through the passage 117.

Liquid will continue to flow into the container and gas will flow from the container to reservoir 36 until the container is completely filled with liquid, the liquid tube 106 also then being filled with liquid because it is in communication with the liquid in the reservoir. In more detail, the next trip to operate the filling head will be so positioned with respect to the path of rotation of the filling table that the disk valve 96 will be returned to neutral stage position after a travel which is sufficient to permit the filling head having the slowest flow characteristics to fill a container. This may result in movement of some liquid up into the lower portion of the gas return path of faster flowing filling heads, but this situation is taken care of as hereinafter described.

Snifting stage

As has been indicated above, when the flow of liquid is to stop, the disk valve 96 will be swung clockwise from the Figure 2 dotted line position designated "Filling Stage" and wherein the passages have the alignment shown in Figure 19, to the Figure 2 solid line position designated "Neutral Stage" and wherein the passages have the alignment shown in Figure 17. This return is accomplished by contact of the upper arm 132 of valve disk 96 with a snifting trip positioned approximately 287½° from the filling trip instead of the usual 265°.

After valve disk 96 has rotated about 60° clockwise (arrow RR of Figure 19) from the position of Figure 19, it will pass through the position indicated in Figure 20 to permit snifting to atmosphere of gas from the container. The position of the valve disk arms 130 and 132 at this moment is indicated by the Figure 2 dotted line showing designated "Blowout Stage."

As the angled passage CPR passes through the position of Figure 20, pressure will be vented from the container to atmosphere as shown by the arrows S of Figure 20. More specifically, gas will move upwardly from the adapter sleeve recess 115 through the passages 117 and 164 and through port 166 into valve disk port 172 to flow downwardly in passage CPR to port 168 to enter a port 188 opening to a body passage 190 which opens to atmosphere. The form of passage 190 is best illustrated in Figures 5 and 10 from which it will be observed that while the port 188 of passage 190 is in the same transverse plane as the return passage 164, the entire passage 190 is closer to the seat face 92 than is the major portion of the passage 164.

Even though the alignment of passages mentioned above is only momentary, the fact that the gas in the container C and passages is now under pressure will result in the flow of gas to atmosphere. Such flow or snift will reduce the pressure within the container sufficiently so that when the container subsequently moves downwardly from the filling head to open its mouth to atmosphere, the container contents will not foam.

It will be noted from Figure 20 that at the moment the container C is placed in communication with the atmosphere, the counterpressure return tube 178 opening to reservoir 36 also will be in communication with the atmosphere because the port 184 at the trailing end of valve disk passage CPR will be in registration with the body element port 174 leading to tube 178. However, the relatively large volume of gas in the reservoir 36 will not be reduced to any substantial extent by this brief registration whereas the relief of pressure from the relatively small filling head passages adjacent container C has a marked effect upon the pressure upon the container.

The rotation of the valve disk 96 past the position of Figure 20 will continue until the disk reaches the neutral position illustrated in Figure 17 at which time all of the passages through the valve disk will be closed. Then the filling head and container will move approximately 15° with the filling table before the container is lowered from the filling head so that after another 15° of filling table rotation, the container will be engaged by the outfeed dial and removed from the filling platform 32. The interval of time between the snifting of Figure 20 and the lowering of the container from the filling head will permit the container contents to rest, thereby further reducing the possibility of foaming when the container is lowered from the filling head.

*Blowout stage*

After a container C has been lowered from a filling head as described immediately above, and before another container is placed beneath that filling head by the infeed dial, the valve disk 96 may be momentarily returned to the position of Figure 20 to enable the filling head passages to be blown out. This movement of disk valve 96 can be accomplished by providing a trip in the path of travel of the filling head and which trip will be engaged by the lower arm 130 to move the latter to the dotted line position designated "Blowout Stage" in Figure 2. At this position, the valve disk passages again will be in the position of Figure 20. Therefore, gas can flow from the upper portion of the reservoir through the tube 178 and through body element passage 176, thence by the upper portion 182 of angled passage CPR and through the intermediate port 172 and port 166 of body element passage 164 and passage 117 to the recess 115 of adapter collar 102. Because the centering bell 108 is now lowered from the adapter collar 102, the discharging gas will flow directly to atmosphere from passage 117. This flow of gas from the reservoir through the counterpressure return passages will eject all liquid and foam from those passages so that they will be clear for return flow of gas during the filling of the subsequent container. Because the lower port 168 of the angled passage CPR is in registration with the passage 190 to atmosphere, any liquid or foam which may have moved into that portion of the passage during the previous filling stage will be ejected to atmosphere through passage 190.

The blowout stage will be very brief to prevent any marked loss of gas from reservoir 36. Therefore, immediately after valve disk 96 has been moved to blowout position, its upper arm 132 will contact with a trip which will rotate the disk clockwise to restore it to neutral position. The continuing rotation of the filling table will then bring the filling platform into alignment with the infeed dial so that a second empty container will be placed beneath the filling head and the above-described filling cycle performed with respect to that container.

All of the gas passages through the filling heads 34 may be of a diameter of approximately five-thirty-seconds of an inch, except that the bore of sleeve 119 in passage 164 will be about one-thirty-second of an inch. This restriction at 119 will prevent too substantial flow of pressure from the container during snifting and also will avoid rise of liquid in passage 164 during the filling and snifting stages.

If the pressure in the filling reservoir 36 is increased, it ordinarily will be desirable to increase the pressure in manifold 82. Adjustment of (a) the pressure in manifold 82, (b) the speed of rotation of the filling table, or (c) the spacing between the counterpressure stage trip and the filling stage trip, will adjust the counterpressure established in a container C. These three factors also can be varied in any combination, bearing in mind that increase of factors (a) or (c) will increase the container counterpressure, while an increase of factor (b) will decrease counterpressure.

It will be obvious that, if desired, the height of filling of a container C can be controlled by the vertical height of a counterpressure return port on the filling nozzle. By the disclosed arrangement, the final filling height is controlled by the displacement effect of the filling nozzle.

It will be observed that the embodiment of the method and apparatus described above attains all of the objects set forth in the opening portion of this specification. The terminology employed in the specification is for the purpose of description and not of limitation, the scope of the invention being defined in the claims.

I claim:

1. The method of filling containers with liquid comprising maintaining a body of the liquid and a superposed body of gas under pressure in a chamber, maintaining a second body of gas under a higher pressure, and initially flowing gas into a container from the second body of gas through momentarily aligned passages of predetermined size so that the pressure thereby established in the container will not exceed the pressure above the body of liquid, and while said pressure exists in the container initiating flow of liquid from the chamber to the container and venting gas from the container to the body of gas in the chamber.

2. In an apparatus for filling containers with a carbonated liquid, a first reservoir for a body of the liquid and a superposed body of gas, a second reservoir for a body of gas at a higher pressure than the gas in said first reservoir, a container support, a filling nozzle, a valve device, a flow line through said valve device to connect said second reservoir and said filling nozzle, a second flow line through said valve device to connect the gas containing portion of said first reservoir and said filling nozzle, a third flow line through said valve device to connect the liquid containing portion of said first reservoir and said filling nozzle, and means to operate said valve device to first momentarily open said first flow line to establish counterpressure in a container positioned at said filling nozzle, then simultaneously open said second and third flow lines to cause liquid to flow to the container from said first reservoir and gas to be returned to said first reservoir from the container, and means effective after opening of said second and third flow lines to operate said valve device to close all of said flow lines and then open said second flow line.

3. Apparatus of the character described in claim 2 wherein said valve device includes a passage extending to atmosphere, and said last mentioned means opens said second flow line into communication with the passage extending to atmosphere.

4. In a rotary filling machine for carbonated liquids, a rotary filling table including container platforms, filling nozzles and a first reservoir for carbonated liquid and a superposed body of gas, a second reservoir for a body of gas, means to maintain the gas in said first reservoir at a lower pressure than the gas in said second reservoir, filling valves respectively associated with said filling nozzles, each filling valve including a body element provided with a planar seat face, a disk valve rotatable on said seat face, three separate flow lines extending to said seat face from the liquid containing and gas containing portions of said first reservoir and from said second reservoir, respectively, said disk valve being provided with three separate passages, a liquid passage extending from said seat face to said filling nozzle, a gas outlet chamber in the filling nozzle and a pair of passages extending from said seat face to said chamber, and trip means spaced about the path of movement of the filling valves with said filling table to first rotate said disk valve to connect the gas outlet chamber to said second reservoir, and then connect said liquid passage to the lower portion of said first reservoir and simultaneously connect said gas outlet chamber to the upper portion of said reservoir.

5. A rotary filling machine of the character described in claim 4 wherein said body element includes a passage extending from said seat face to atmosphere, and means effective after said trip means to rotate said disk valve to connect the filling nozzle gas outlet chamber to said last-mentioned passage.

6. A rotary filling machine of the character described in claim 4 wherein said body element includes a passage extending from said seat face to atmosphere, and means effective after said trip means to rotate said disk valve to place said flow line extending from the gas container portion of said first reservoir in communication with said last-mentioned passage.

7. A rotary filling machine of the character described in claim 4 including means effective after said trip means to remove a container from said filling nozzle and means to then rotate said disk valve to place the flow line extending from the gas containing portion of said first reservoir in communication with said gas outlet chamber.

8. In an apparatus for filling containers with a carbonated liquid, a first reservoir for a body of the liquid and a superposed body of gas, a second reservoir for a body of gas at a higher pressure than the gas in said first reservoir, a container support, and means to flow gas from said second reservoir to a container under such control that the pressure in the container will approximate the pressure in said first reservoir, and a common gas source connected to both of said reservoirs, and a float operated valve to control flow of gas from said source to said first reservoir.

9. In an apparatus for filling containers with a carbonated liquid, a first reservoir for a body of the liquid and a superposed body of gas, a second reservoir for a body of gas at a higher pressure than the gas in said first reservoir, a container support, and means to flow gas from said second reservoir to a container under such control that the pressure in the container will approximate the pressure in said first reservoir, and a common gas source connected to both of said reservoirs, a float operated valve to control flow of gas from said source to said first reservoir and means to control flow of gas to said second reservoir from said source.

References Cited in the file of this patent

UNITED STATES PATENTS

| Number | Name | Date |
|---|---|---|
| 582,285 | Henes et al. | May 11, 1897 |
| 921,032 | Webster et al. | May 11, 1909 |
| 2,109,489 | Le Frank | Mar. 1, 1938 |
| 2,605,949 | Stern | Aug. 5, 1952 |